July 2, 1929.　　　R. WOLF　　　1,719,791
LAWN MOWER
Filed April 16, 1927　　2 Sheets-Sheet 1
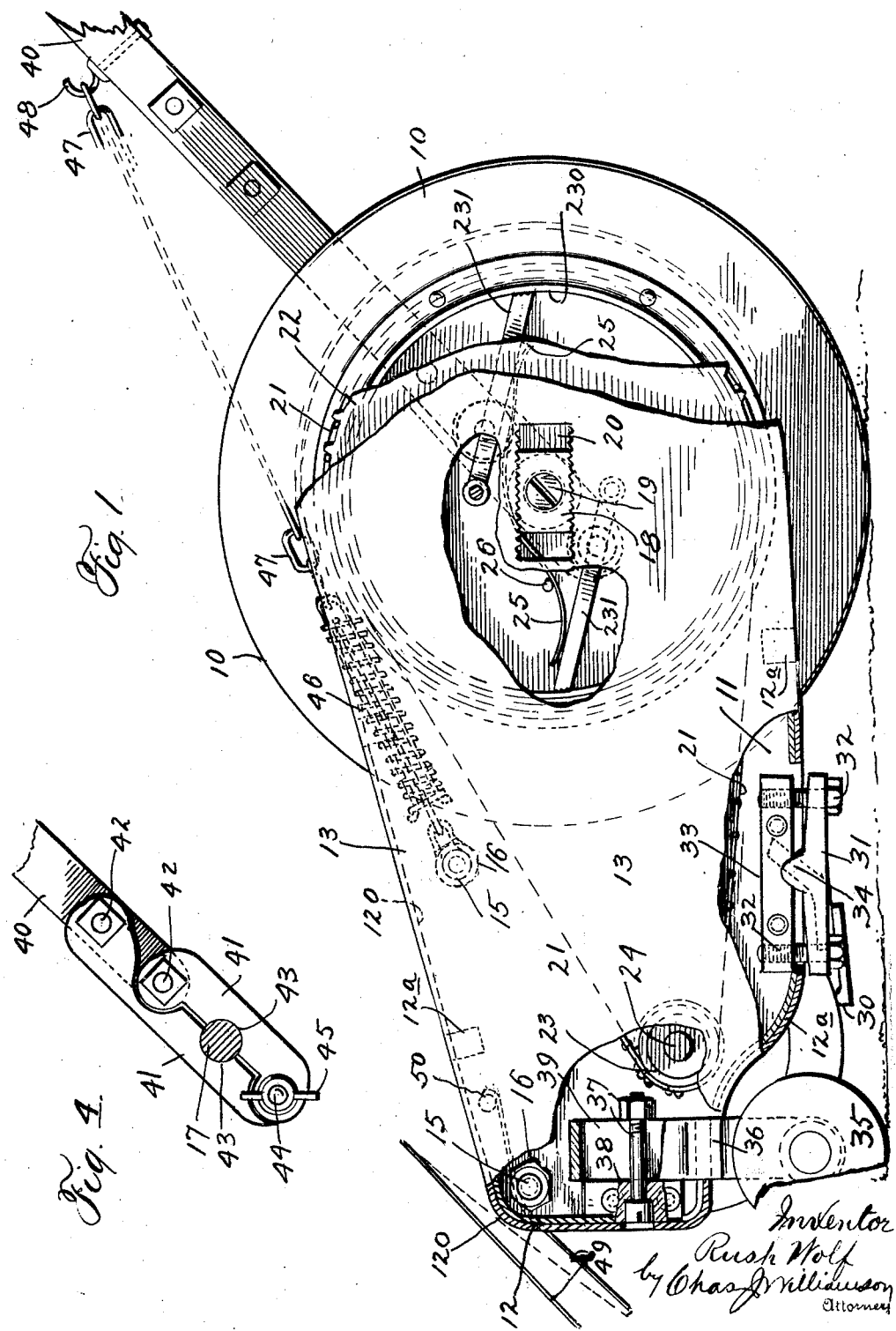

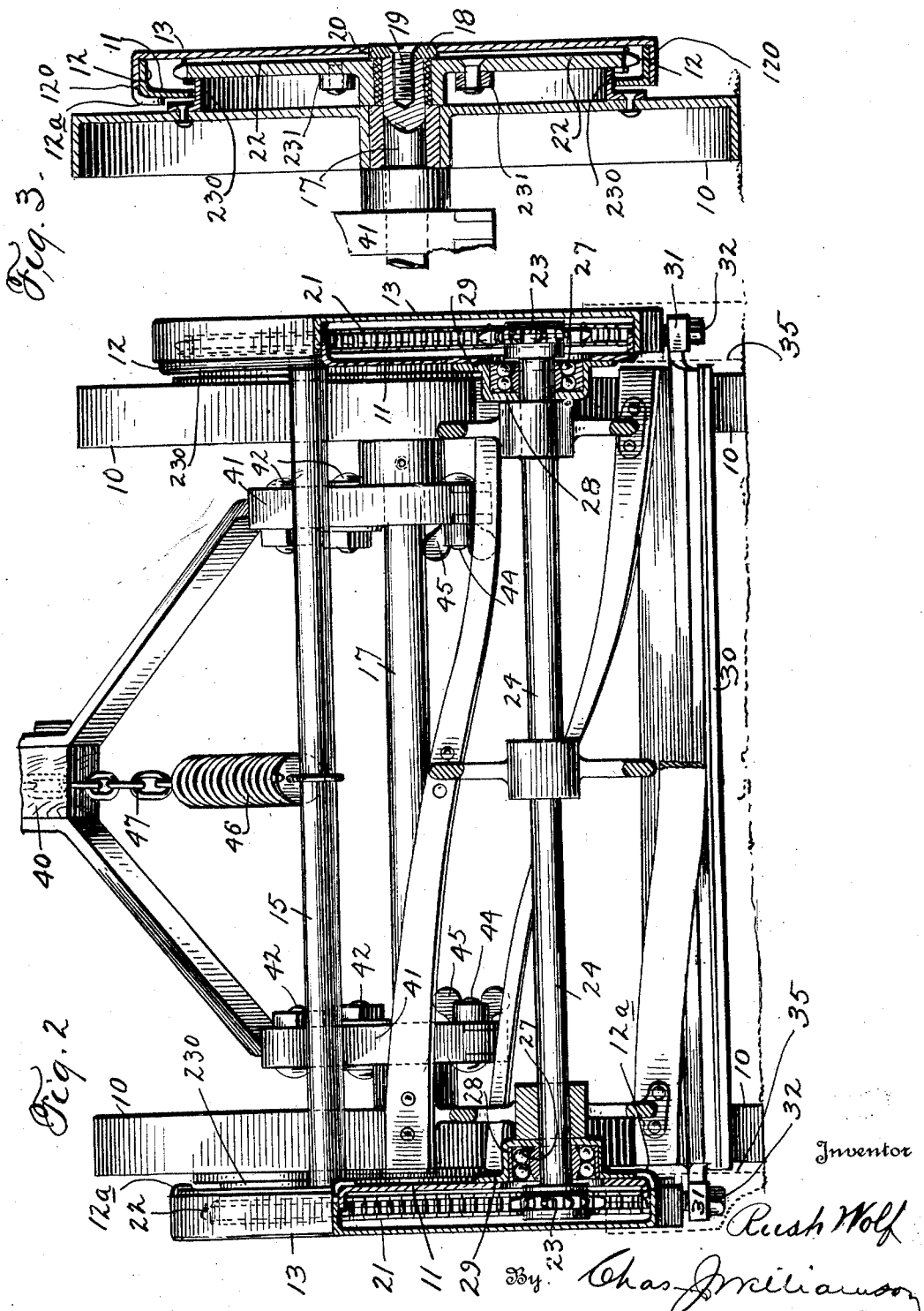

Patented July 2, 1929.

1,719,791

UNITED STATES PATENT OFFICE.

RUSH WOLF, OF BLOOMVILLE, OHIO.

LAWN MOWER.

Application filed April 16, 1927. Serial No. 184,380.

The object of my invention, generally stated, is to provide a lawn mower having all necessary strength and durability, but which will be light in weight, inexpensive to manufacture, strong and durable in respect of the reel driving mechanism, and capable of mowing close to objects without danger of injuring them or being damaged or injured by contact therewith. My invention consists in whatever is described by, or is included within the terms or scope of the appended claims.

In the drawings:

Fig. 1 is a side elevation of a lawn mower embodying my invention with parts of the combined housing and frame side broken away;

Fig. 2 is a transverse section through the cutting reel;

Fig. 3 is a detail view in transverse section through one of the driving wheels;

Fig. 4 is a detail view of the handle connection.

In its general respects my lawn mower is like the lawn mower in common use, in that it has a stationary cutter bar at the front of the machine, a revolving reel that has a series of blades which cooperate with the stationary cutter bar, driving wheels at the rear which drive the reel and a handle at the rear by which the machine may be pushed along.

Describing in detail what is shown in the drawings, the drive connection or gearing between the driving wheels 10, comprises a sprocket gearing between each drive wheel and the knife reel, and I provide a housing for the sprocket gearing at each side of the machine which is situated at the outer side of the adjacent drive wheel and I make such housing serve as the side frame of the machine, thus making the one element or member serve the double purpose of a housing and a side frame member. It will be seen that I thus also provide a driving connection between the driving wheels and the reel at both sides of the machine, and thus avoid unbalanced or twisting strains upon the driving parts and this means the avoidance of undue friction upon the shafts and particularly upon the reel shaft so that wear is prevented and easy running of the machine is contributed to. By locating the driving wheels at the inner side of the housing-frame member, I am able to have the distance between such wheels on the outside not greater than the length of the reel and thereby the running of the driving wheels over uncut grass is prevented.

The housing-frame member consists of two plates preferably both of sheet metal, an inner plate, 11, which has at its outer edge an outturned rim or flange, 12, and a flat or smooth outer plate, 13, which has a marginal flange, 120, that overlaps the flange, 12. The two plates may be detachably connected together by bolts and nuts if desired, although I prefer to connect them by lugs or lips, 12$^a$, on the outer plate that are bent down over the inner plate. These plates are preferably made of pressed steel. The flanging of the plates, of course, stiffens them. At suitable intervals apart are several tie-rods, 15, that extend transversely from one housing-frame member to the other, such rods having heads to engage the outer side of one member and nuts, 16, to engage the outer side of the other member. Also extending across from member to member, in the rear of the machine is a non-rotating shaft or bar, 17, upon which the drive wheels, 10, are mounted to revolve. At each end of said rod, 17, a block, 18, is removably attached by a screw, 19, that enters a threaded hole in the end of the rod which block, 18, is situated in a longitudinally extending slot, 20, in the outer plate, 13, so that the rod, 17, may be shifted back and forth to adjust the tension of the sprocket chains 21, which, respectively, run from a sprocket wheel, 22, journalled to run free on the shaft, 17, to a sprocket pinion, 23, on the reel shaft 24. The block preferably at top and bottom is ridged or toothed and the top and bottom walls of the slot, 20, are similarly ridged or toothed, to lock the block at the desired place of adjustment in the slot. Adjustment is simply and easily done by removing each screw, 19, far enough to clear the block, 18, of the slot walls, and then after shifting the bar, 17, to the desired adjustment the block, 18, is replaced by turning its screw.

Since each drive sprocket wheel, 22, is loose from the adjacent drive wheel, a suitable clutch device is provided to rotatively connect each driving wheel and its sprocket wheel only when the lawn mower is pushed forward. The clutch, I prefer to use is of the pawl and ratchet type and I provide a simple and strong construction which consists of the ring 230 which is riveted to the outer side of the adjacent drive wheel 10, and preferably two pawls 231, each in the form of a simple straight bar pivoted at one end of the center of the sprocket wheel on the side thereof, the free outer end of which has ratchet teeth to engage similar teeth on or to bite into the inner periphery of the ring 230. I employ a single spring for both pawls that is a simple curved strip 25 which extends diametrically from one pawl to the other, curving or arching over the sprocket wheel hub and held under tension by a stud or screw 26, is attached to the adjacent side of the sprocket wheel and bearing on the outer side of the strip 25, near one end thereof.

At each end of the reel shaft 24, is a ball-bearing 27, situated adjacent, the inner side of the housing-frame member 11, and such bearing is secured in place and at the same time is housed so that no dirt or grass can enter it, by a cup like cap, 28, having a hole through which the shaft passes and which closely fits the shaft and has an external flange, 29, that extends beyond the hole in the inner plate 11, concentric with the sprocket pinion hub and which overlaps the plate 11, sufficiently beyond such hole to safeguard against the entrance of dirt. The flange 29, affords means for riveting the cup to the side of the plate 11. The stationary knife 30, is secured to a cross bar 31, which at each end at front and back has a bolt or screw, 32, which passes upward into a threaded hole in a bar 33, riveted to the inner housing-frame plate 11, and thereby the bar 31 is secured in place and to enable rocking of the bar to adjust the knife edge up and down with reference to the reel, a rocking bearing is provided between the upper side of the bar 31, and the underside of the bar, 33, which bearing comprises a round boss 34, upon the bar 31, and a rounded recess in the underside of the bar, 33.

Instead of the customary transversely extending roller provided at the front of the usual lawn mower, I provide at each side at the front a wheel, 35, which is journalled at the lower end of a vertical post or bracket, 36, which by a bolt and nut 37, is attached to a block 38, riveted to the adjacent side plate 11. The post 36, has a vertical slot 39, to allow vertical adjustment of the wheels 35, which thus constitute gage-wheels to fix the cutting level of the machine.

The handle 40, is pivotally attached to the shaft or bar, 17, so that it may be swung from a position extending to the rear for pushing the machine or to a position at the front of the machine to enable the machine to be pulled along by the operator walking ahead of the machine if he so desires, and this also renders it possible with the handle extending rearwardly to swing the machine upwards and backwards, so that it will rest upon the handle and thus clear the ground and enable the machine to be rolled or trundled along on the wheels when it is desired to move the machine about, without cutting, and so as to be entirely clear of obstacles on the ground. The pivotal connection between the handle and the shaft 17 which I prefer to employ is one that enables the handle to be quickly detached and applied, detachability being desirable to enable the mower to be stored in a compact or small space or put in a vehicle for transportation. Such connection comprises two substantially similar jaws, 41, which are respectively secured to the handle by cross bolts 42, and which beyond the end of the handle have opposite semi-circular notches 43, to engage opposite sides of the rod 17, and at their free ends said jaws have alining holes through which passes a bolt 44, which has a wing nut 45, to secure the jaws in shaft engaging positions. By the removal of the wing nut and its bolt, the jaws may be opened to clear the shaft.

When the handle extends rearwardly and the machine is to be pushed, I support the handle at the angle most convenient for the operator by means of a spring connection between the handle and the frame which connection comprises a coil spring, 46, which at one end is linked to one of the cross bars, 15, and at the other end is connected by a chain, 47, to a hook, 48, on the handle. By changing the link engaging the hook, 48, the angle of the handle can be readily adjusted. Since the spring and chain connection is forward of the drive wheels, it will be seen that when the operator presses downward upon the handle as he naturally will in pushing the effect is to tend to lift the front of the machine and to throw the weight on the drive wheel, which, of course, is very desirable for increasing the traction of the drive wheels and by taking the weight off of the front ground-engaging wheels, 35, they will be prevented from crushing the grass or cutting into the ground. By changing the chain link connection with the hook, 48, and thus shortening it, the reel may be raised to a height, for instance, eight inches, to cut high grass, and to cut over rough ground.

I use no ratchet on the knife reel shaft, but the sprocket wheels are fixed solidly to the shaft. I thus avoid the disadvantage of the ratchet on the reel shaft that it must be small, and therefore, frail, so that it constitutes the weak part of a lawn mower. The ratchet devices I employ can, therefore, be large enough to possess all required strength or sturdiness, as the drum in which they work can be made as large as six inches in diameter on the inside. An important feature of my ratchet mechanism is that the ratchets are always ready to instantly catch, so that rotation of the knife reel begins immediately with turning of the drive wheels.

To avoid damage or injury to flowers when they droop or lie close to the ground, and therefore might be struck by the machine, I provide a spring finger, 49, which inclines downwardly and forwardly of the machine reaching near to the ground so that it will first strike any such flowers and gently lift the same upward out of the way. This finger may be supported on the front cross bar, 15, by being passed over the same, and at its rear and near the top of the housing-frame it may pass under a projection, 50, and thus be firmly held in place although it may be readily removed and readily applied.

As I have explained, I prefer to make the housing plates, 11 and 13 of pressed steel. I also make the drive wheels, 10, of pressed steel and the clutch ring, 230, and the ball-bearing housing, 28, are preferably made of pressed steel. Thus the cost of manufacture is cheapened and yet a strong and mechanical working structure is provided. As the outer housing-frame member plate, 13, is smooth or flat without any projections whatever, it will be seen that no damage or injury can be caused by striking trees, monuments or other surfaces besides which the mower is run. The ends of the knife reel can be given a clearance from the housing-frame members of about one-quarter of an inch, and as the plates, 11 and 13, need not be more than three-quarters of an inch apart, it will be possible to cut the grass within one inch to an object or obstruction on the ground.

I pointed out a number of the advantages of the construction which enters into my lawn mower, but other advantages will be understood and appreciated by those skilled in the art.

What I claim is:

1. A lawn mower having a knife reel and driving wheels, a gear connection between the driving wheels and the reel at both sides of the machine and a side frame of the machine that constitutes a housing for each gear connection, said side frame comprising horizontally spaced apart vertical plates which reach forward of the reel, rolling supporting means forward of the reel and vertical posts journaling said rolling means under the housing at each side and extending upward within the housing and means reaching within the housing adjustably connecting said posts within the housings.

2. A lawn mower having a knife reel and driving wheels, a gear connection between the driving wheels and the reel at both sides of the machine and a side frame of the machine that constitutes a housing for each gear connection, said housing comprising spaced inner and outer plates, and reaching forward of the reel, rolling means forward of the reel, above which the housings reach, vertical posts journalling said rolling means and means adjustably connecting said posts within the housings including a block in each case attached to one of the housing plates, and housed within the said housing.

3. A lawn mower comprising driving wheels, a reel and a gear connection between said wheel and the reel at both sides of the machine, and a side frame of the machine that constitutes a housing for each gear connection situated on the outer sides of the wheel and extending from the wheel to the reel, said side frame comprising horizontally spaced vertical plates, a bar upon which the driving wheels are mounted extending between the outer plates, blocks situated in longitudinally extending slots in the outer plates and adjustable longitudinally therein, and means separately connecting said blocks to the ends of the bar.

4. A lawn mower comprising a driving wheel, a reel and a gear connection between said wheel and the reel and a side frame of the machine that constitutes a housing for the gear connection situated on the outer side of the wheel and extending from the wheel to the reel and the outer surface of said side frame being plane, said side frame comprising two flat plates, an inner one which has an outwardly turned flange and an outer plate applied to the outer edge of said flange, said outer plate having an inwardly projecting flange which overlaps the flange of the inner plate.

5. In a lawn mower, combined reel rotating means and ratchet comprising a driving wheel, a gear wheel alongside the driving wheel, a clutch ring secured to the side of one wheel, two oppositely located pawls pivoted at their inner ends to the side of the other wheel and reaching in opposite directions towards the clutch ring, a single spring extending from one pawl to the other, and pressing both normally into clutch ring engagement to cooperate with said ring and a shaft on which said wheels are mounted to turn, and a housing for said gear and clutch mechanism.

6. A lawn mower comprising a reel, driving wheels and a driving connection between both wheels and the reel at both ends of the reel, comprising in each case a sprocket wheel connected with one driving wheel, a sprocket wheel drivingly connected with such end of the reel, and a sprocket chain connecting said sprocket wheels, and side frames of the machine that constitute housings for said sprocket wheels and chain, comprising horizontally spaced vertical plates between which the wheels and chain are situated, said plates having at their outer edges oppositely projecting and overlapping flanges forming a lapped joint around substantially the entire periphery of the housing, and transverse connections between the two side frames.

7. A lawn mower comprising a reel, wheels in rear of the reel, a ground engaging support in front of the reel, a frame of the machine comprising at each side horizontally spaced apart vertical plates and a tie bar between the two sets of frame plates and forward of said wheels, said wheels being between the two sets of frame plates, driving connections between the wheels and the reel housed in the space between said plates, a handle adapted to extend rearwardly, and a spring connection between the handle and the frame tie bar.

8. A lawn mower having a knife reel and driving wheels, a gear connection between the driving wheels and the reel at both sides of the machine and a housing for each gear connection that constitutes the side frame of the machine, said housing comprising spaced inner and outer plates of sheet metal which have marginal overlapping flanges.

In testimony whereof I hereunto affix my signature.

RUSH WOLF.